No. 629,496. Patented July 25, 1899.
S. E. DIESCHER.
MACHINE FOR BENDING STRUCTURAL SHAPES.
(Application filed Mar. 23, 1899.)

(No Model.) 10 Sheets—Sheet 1.

FIG. I.

WITNESSES:
Chas. F. Miller
F. M. Dapfer

INVENTOR,
Samuel E. Diescher
by Daniel S. Wolcott
Att'y.

No. 629,496. Patented July 25, 1899.
S. E. DIESCHER.
MACHINE FOR BENDING STRUCTURAL SHAPES.
(Application filed Mar. 23, 1899.)

(No Model.) 10 Sheets—Sheet 2.

FIG. 2.

WITNESSES:
Chas. F. Miller.
F. M. Dapper.

INVENTOR,
Samuel E. Diescher
by Dennis S. Wolcott
Att'y.

FIG.3.

No. 629,496. Patented July 25, 1899.
S. E. DIESCHER.
MACHINE FOR BENDING STRUCTURAL SHAPES.
(Application filed Mar. 23, 1899.)

(No Model.) 10 Sheets—Sheet 4.

WITNESSES:
Chas. F. Miller
F. W. Dapper

INVENTOR,
Samuel E. Diescher
by Damon B. Wolcott
Att'y.

THE NORRIS PETERS CO., PHOTO-LITHO., WASHINGTON, D. C.

No. 629,496. Patented July 25, 1899.
S. E. DIESCHER.
MACHINE FOR BENDING STRUCTURAL SHAPES.
(Application filed Mar. 23, 1899.)
(No Model.) 10 Sheets—Sheet 6.

FIG. 6.

WITNESSES:
Chas. F. Miller.
F. W. Dapper

INVENTOR,
Samuel E. Diescher
by Dennis S. Wolcott
Att'y.

No. 629,496. Patented July 25, 1899.
S. E. DIESCHER.
MACHINE FOR BENDING STRUCTURAL SHAPES.
(Application filed Mar. 23, 1899.)
(No Model.) 10 Sheets—Sheet 7.

WITNESSES:
INVENTOR,
Samuel E. Diescher
by Damon S. Wolcott
Att'y.

No. 629,496. Patented July 25, 1899.
S. E. DIESCHER.
MACHINE FOR BENDING STRUCTURAL SHAPES.
(Application filed Mar. 23, 1899.)
(No Model.) 10 Sheets—Sheet 8.

WITNESSES: INVENTOR,

No. 629,496. Patented July 25, 1899.
S. E. DIESCHER.
MACHINE FOR BENDING STRUCTURAL SHAPES.
(Application filed Mar. 23, 1899.)

(No Model.) 10 Sheets—Sheet 9.

WITNESSES:
Chas. F. Miller
F. M. Dapper

INVENTOR,
Samuel E. Diescher
by Darwin S. Wolcott
Att'y.

THE NORRIS PETERS CO., PHOTO-LITHO., WASHINGTON, D. C.

No. 629,496. Patented July 25, 1899.
S. E. DIESCHER.
MACHINE FOR BENDING STRUCTURAL SHAPES.
(Application filed Mar. 23, 1899.)
(No Model.) 10 Sheets—Sheet 10.

WITNESSES:
Chas. F. Miller.
F. M. Dapper

INVENTOR,
Samuel E. Diescher
by Damin & Wolcott
Att'y.

THE NORRIS PETERS CO., PHOTO-LITHO., WASHINGTON, D. C.

UNITED STATES PATENT OFFICE.

SAMUEL E. DIESCHER, OF PITTSBURG, PENNSYLVANIA.

MACHINE FOR BENDING STRUCTURAL SHAPES.

SPECIFICATION forming part of Letters Patent No. 629,496, dated July 25, 1899.

Application filed March 23, 1899. Serial No. 710,179. (No model.)

*To all whom it may concern:*

Be it known that I, SAMUEL E. DIESCHER, a citizen of the United States, residing at Pittsburg, in the county of Allegheny and State of Pennsylvania, have invented or discovered certain new and useful Improvements in Machines for Bending Structural Shapes, of which improvements the following is a specification.

The invention described herein relates to certain improvements in mechanism for bending structural shapes—such as angle-bars, I-bars, channels, &c.—and has for its object a construction and arrangement of mechanical elements whereby such structural shapes may be bent to any desired curvature and be held during the bending operation in such manner as to prevent twisting or distortion.

The invention is hereinafter more fully described and claimed.

In the accompanying drawings, forming a part of this specification, Fig. 4 is a sectional elevation, the plane of section being through the axes of the anvil or holding rolls. Fig. 4ª is a sectional detail view, the plane of section being indicated by the line $x\ x$, Fig. 4. Fig. 7 is a plan, and Fig. 8 a side elevation, of one of the twin members of the gripping or holding mechanism. Figs. 9 and 10 are sectional views of the same, the respective planes of section being indicated by the lines IX IX and X X, Fig. 7. Fig. 11 is a perspective view of a portion of the gripping and holding mechanism.

My improved mechanism consists, broadly, of (*a*) mechanism for effecting movement of the article to be bent and the holding of the same at successive points as against transverse or lateral movement during such endwise feed, (*b*) mechanism operative at successive intervals for deflecting or bending the article laterally, and (*c*) mechanism for holding the article from torsion or bending in directions at an angle to the plane in which the bending mechanism operates.

Figures 4, 4A:
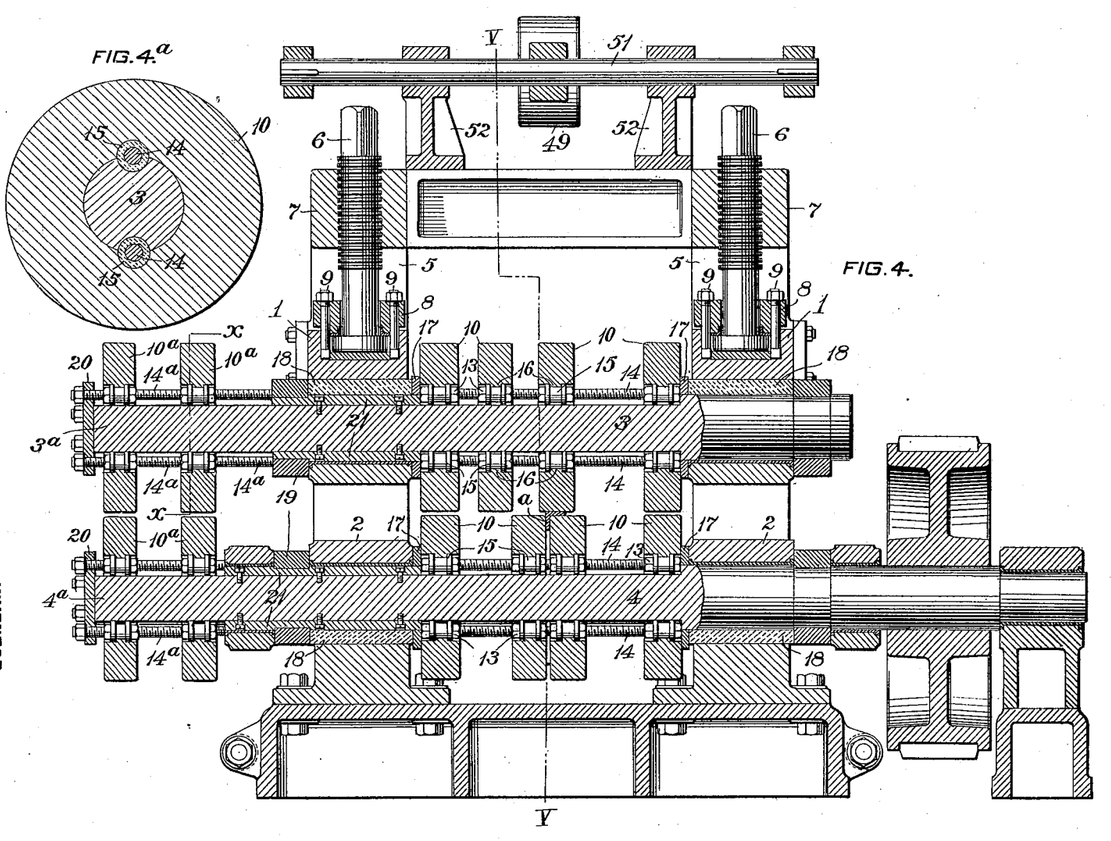
Figures 12, 13, 14:
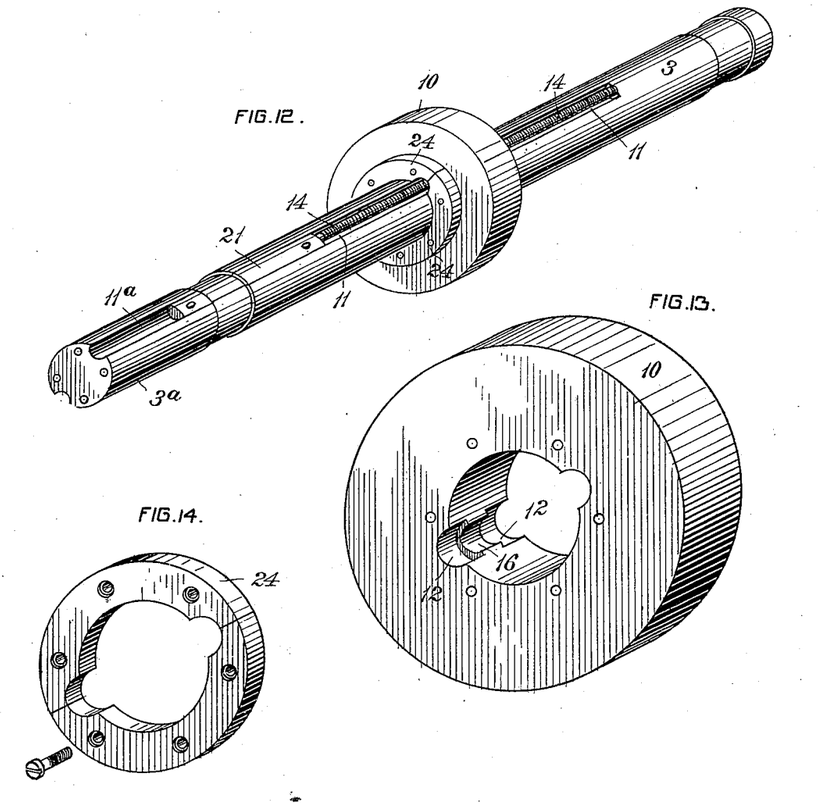
Figs. 12, 13, 14, and 15 are perspective detail views of one of the roll-shafts, roll, filling-section, and roll-adjusting nut.
Figure 15:
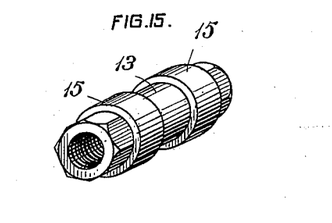

In the practice of my invention the journal-boxes 1 and 2 of the roll-shafts 3 and 4 are mounted in housings 5 in such manner as to permit the boxes 1, carrying the upper shaft, to be raised and lowered by the adjusting-screws 6, which pass through the caps 7 of the housing and have their lower ends detachably connected to the boxes 1. A convenient means for connecting the screws to the boxes consists in forming sockets in the boxes for the reception of the lower ends of the screws, which are held therein by sectional collars 8, held against heads on the screws by bolts 9, as shown in Fig. 4. Rolls 10 are so mounted on the shafts that while capable of adjustment along the shafts for purposes to be hereinafter described they will be positively rotated by the shafts. This adjustability and locking of the rolls on the shafts can be effected in several ways—such, for example, as that shown in Figs 4, 4ª, and 12 to 15, inclusive. In this construction longitudinal grooves 11 are formed in diametrically opposite sides of the shaft and similar grooves 12 are formed across the inner perimeter of the rolls. These grooves 11 and 12 form, when the rolls are placed on the shafts, a circular key way for the adjusting-nuts 13, which when placed in position serve to lock the rolls to the shafts. Threaded rods 14 are passed through the nuts 13, which are locked to the rolls by means of interlocking shoulders 15 and 16 on the nuts and rolls, so that by the rotation of the nuts if the threaded rods are held stationary the rolls will be shifted along the shafts. The threaded rods can be held stationary as against movement along the shafts by any suitable means—as, for example, in the construction shown in Figs. 4 and 12. The ends of the rods bear against the end walls of the grooves 11 in the shafts, said grooves being made of such a length that such end walls are in line with the ends of the journal-boxes of the shafts or wearing-rings 17, which bear against the boxes or the brasses 18. The rods 14ª, employed for adjusting the rolls 10ª on the overhanging portions 3ª and 4ª of the shafts, which are made sufficiently long to project at one end beyond the housing, are held from longitudinal movement by the thrust-collars 19 and the end plates 20, bolted to the ends of the shafts. These thrust-collars are formed in sections, so as to be bolted around the shafts in such positions as to bear against the ends of the journal-boxes, and as they fit within peripheral grooves formed in the shafts they will hold the latter from longitudinal movement. For convenience of construction the grooves 11 and 11ª are made continuous, and the portions thereof within the housing are filled by strips 21, thereby making such portions smooth and continuous, as shown in Figs. 4 and 12.

In the construction shown in Figs. 16 to 20 splines 22 22ª are formed on the shafts so as to engage transverse grooves in the rolls, thereby so interlocking the rolls and shafts that they will rotate together. The longitudinal adjustment of the rolls is effected by means of studs 23, screwing into the thrust-collars 17 and bearing at their heads against the end rolls of the series.

Figures 16, 17, 18, 19, 20:
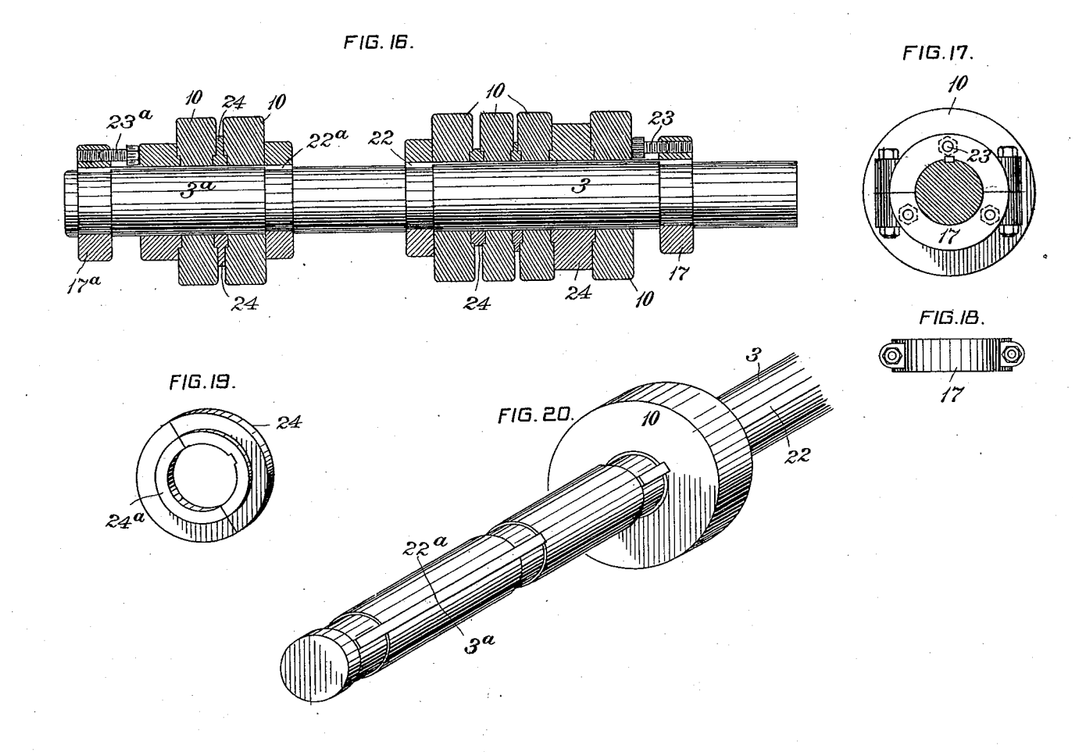
Fig. 16 is a sectional view of a shaft and rolls, illustrating a modification in the roll-adjusting mechanism.
Fig. 17 is a transverse section of the shaft, the rolls being shown in elevation.
Fig. 18 is an edge view of one of the ring-abutments.
Figs. 19 and 20 are perspective views of a filling-ring and the shaft and one of the rolls.
Figure 21:
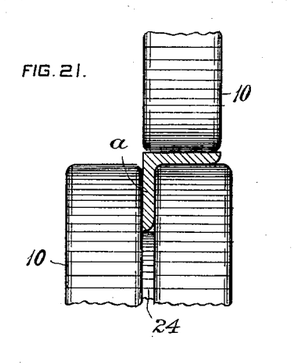
Figs. 21 to 25, inclusive, illustrate various adjustments of the holding or anvil rolls for clamping different angular shapes during the bending operation.
Figure 22:
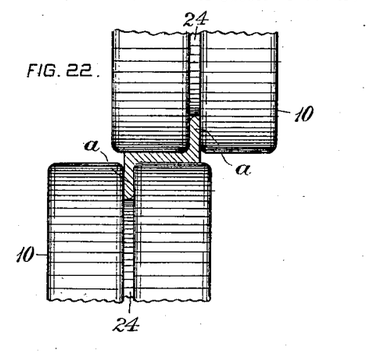
Figure 23:
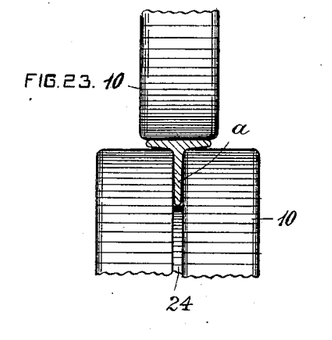

As it is necessary in bending shapes that the edges of the portions a of the shapes which are bent edgewise should be supported and that such portions should also be supported or braced laterally, as being subjected to the greatest strain and also being liable to distortion, the rolls 10 are adjusted together, so as to bear more or less firmly against the sides of the portion a of the shape, as shown in Figs. 21, 22, and 23. The edge-bearings for these portions a are formed by collars 24, arranged between the rolls 10. As the thickness of the portions a of the shapes varies with different dimensions of shapes, the collars are in sections, as shown in Figs. 12, 14, and 19, so as to permit of the removal and insertion of different sizes of collars in accordance with the requirements of the work to be performed. As shown in Figs. 12 and 14, these collars may be bolted to the sides of the rolls 10, or the latter may be recessed in their sides for the reception of raised portions 24ª, formed on the sides of the collars, as shown in Figs. 16 and 19. In the latter construction the collars are held in place by adjacent rolls, which are pressed against the collars by the adjusting-studs 23.

The rolls 10 10ª on the shafts 3 and 4 effect the longitudinal movement of the shapes to the bending mechanism, one or both of said rolls being positively driven, and also serve as anvil or clamping rolls to laterally hold or support the article at successive points while being operated at points outside or in the rear of the rolls 10 by the bending mechanism. This bending mechanism consists of a shaft 25 and rolls 26, similar in construction to the anvil shaft and rolls hereinbefore described. The shaft 25 is mounted in journal-boxes 27, which are mounted in auxiliary housings 28, arranged at an angle to the housings 5. The journal-boxes are adjusted in the housings to raise and lower the bending-rolls by means of screws 29, connected to the boxes in any suitable manner, but preferably in the same manner that the screws 6 are connected to the boxes 1. As will be readily understood by those skilled in the art, the curvature imparted to the shape will be dependent upon the height of the periphery of the bending-roll above a horizontal plane passing between the rolls on the shafts 3 and 4 and also upon the angular movement of the rolls 26 toward the rolls on the upper shaft 3.

Figure 5:
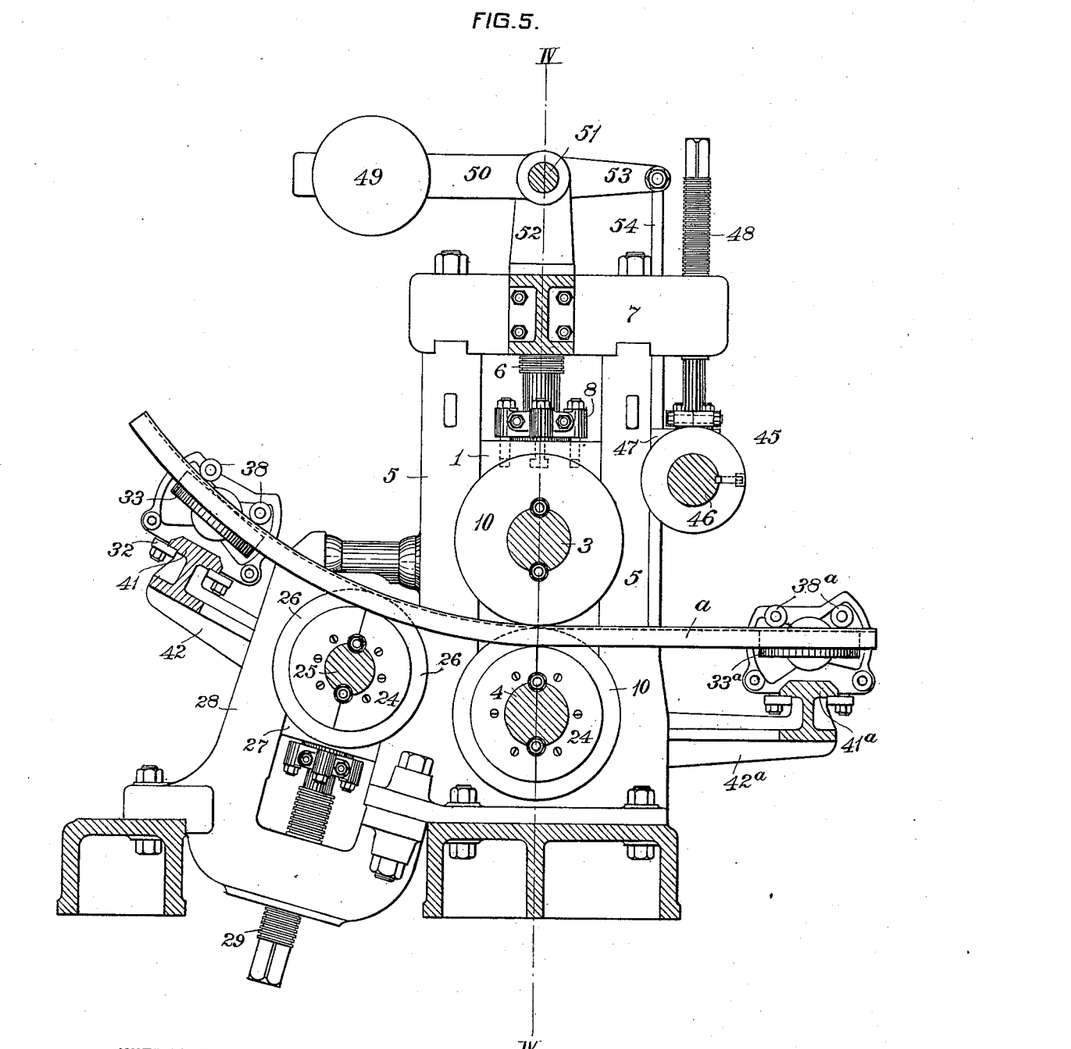
Fig. 5 is a transverse vertical section in the plane indicated by the line V V, Fig. 4.
Figure 6:
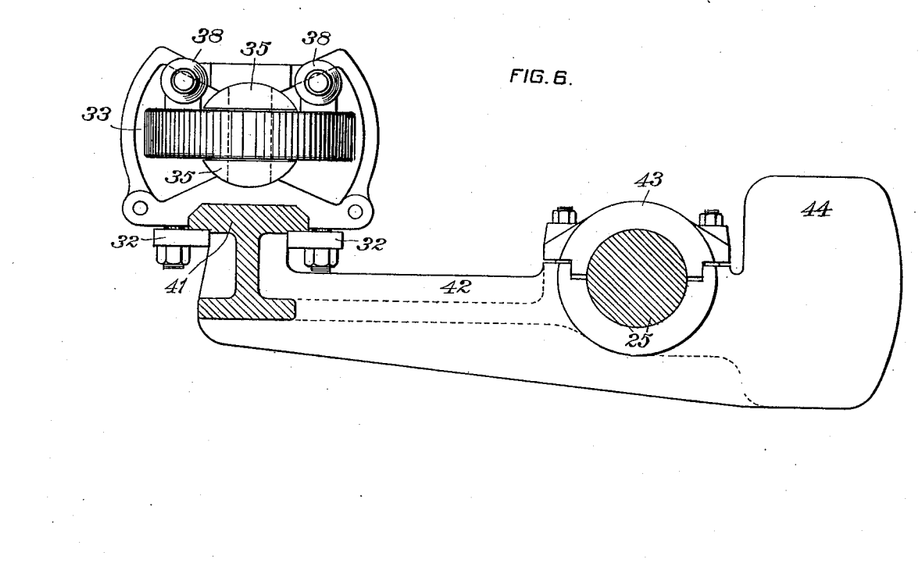
Fig. 6 is a detail view of the floating gripping or holding mechanism.
Figures 7, 8, 9, 10, 11:
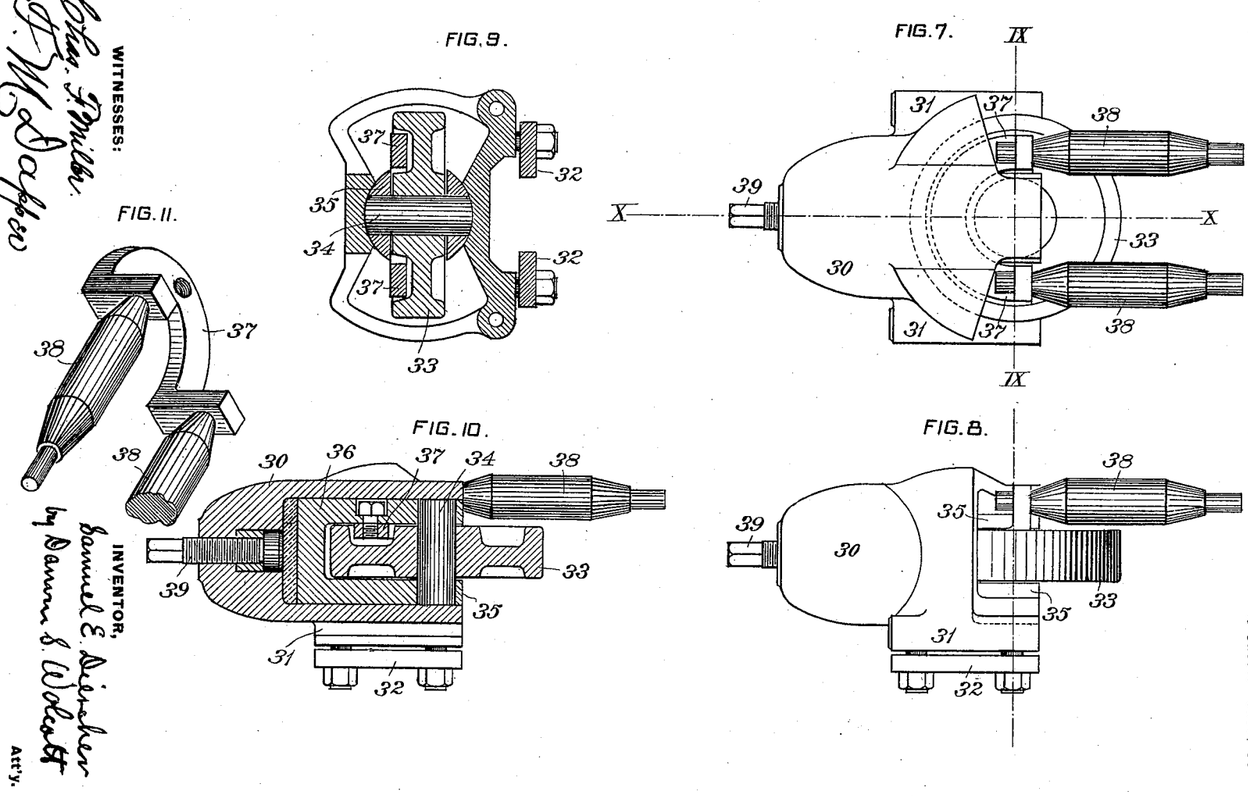

It has been found that the bending of structural shapes in one plane or direction effects an angular distortion or curvature of the shape. In order to prevent such distortion or accidental curvature, means are provided for holding the shape or, when required, for returning or bending back the distorted part. A desirable form of holding or correcting mechanism is shown in Figs. 1, 2, 3, 5, 6, 7, 8, 9, 10, and 11, and consists of twin members. Each of the members consists of a hollow cylindrical shell 30, provided with supporting-flanges 31, adapted to rest on a supporting-rail and to be held thereon with a freedom of adjustment by means of clamping-plates 32. A bearing-roll 33 is loosely mounted on a pin 34, having its ends journaled in the prongs 35 of the slotted or forked bearing-block 36. The external contour of the forked block is cylindrical, as shown in Fig. 9, so that it may rotate and permit of the automatic movement of the plane of rotation of the roller, as hereinafter described. A semicircular yoke 37, provided at its ends with bearings for the journals of retaining-rollers 38, is secured to the bearing-block 36, so that the rollers 38 will follow the automatic adjustment of the roll 33. An adjustment of the bearing-block and the parts carried thereby can be effected by the screw 39, passing through the end of the shell 30.

Figure 1:
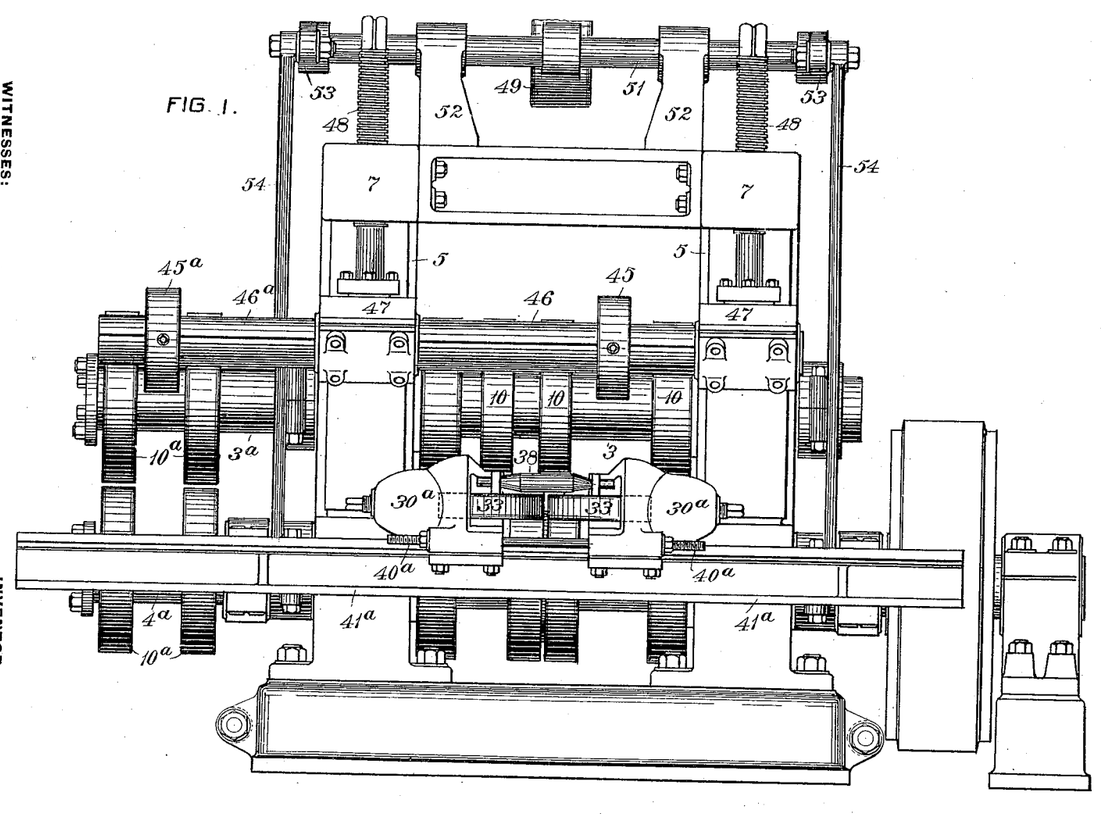
Figure 1 is a front elevation of my improved bending mechanism.
Figure 2:
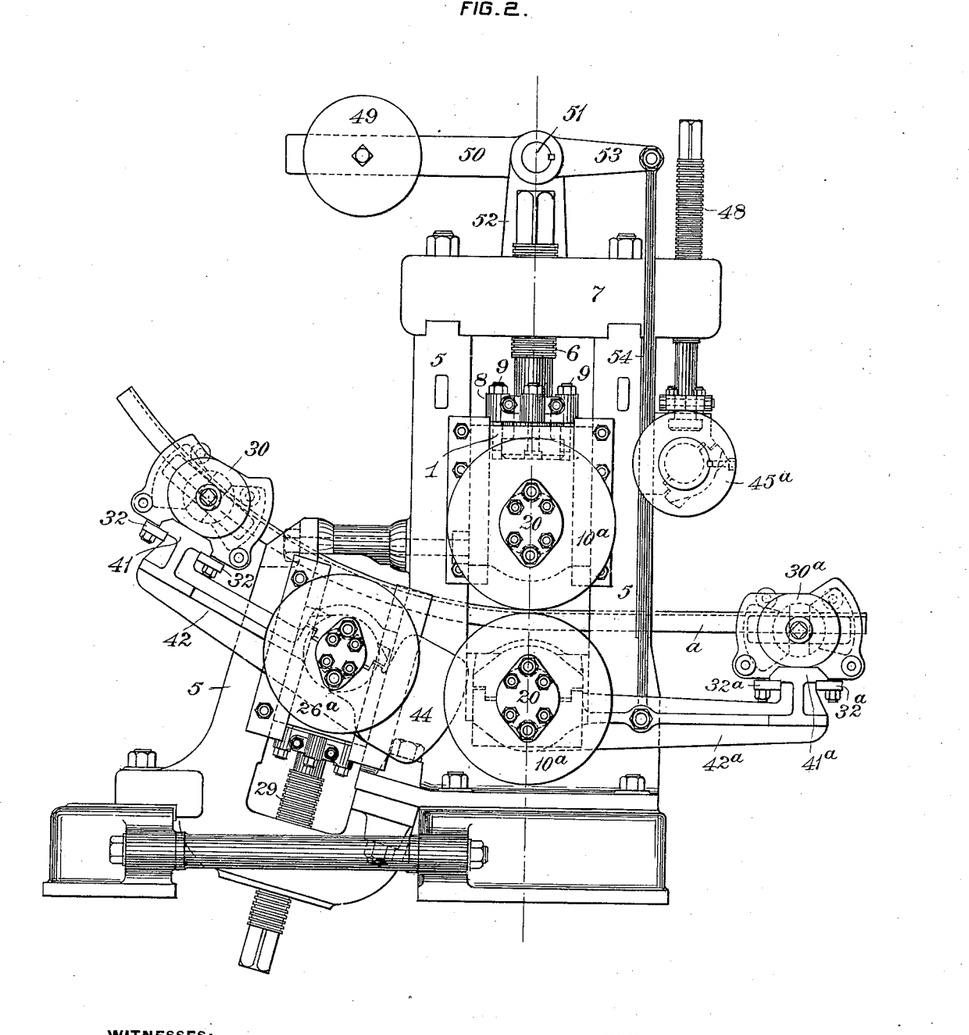
Fig. 2 is an end elevation of the same.
Figure 3:
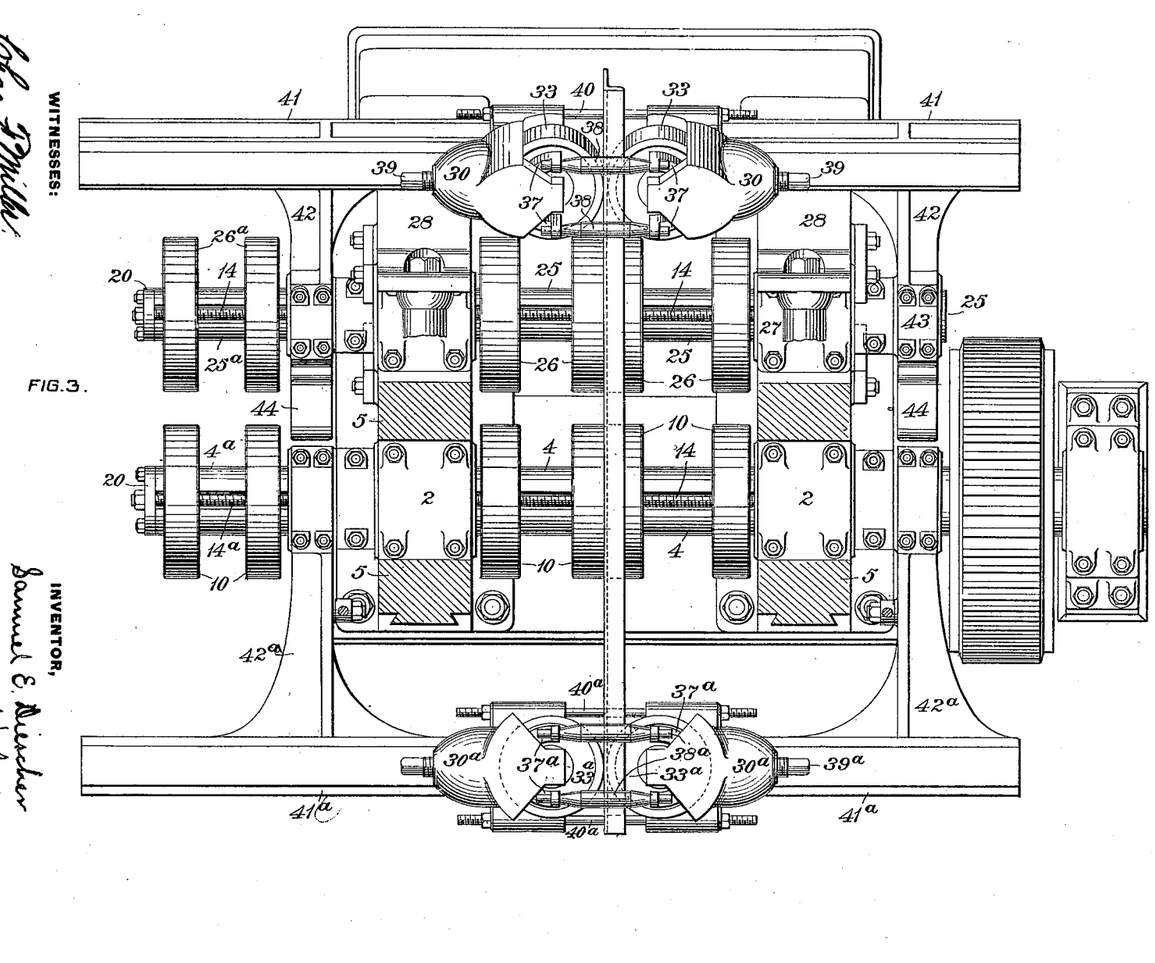
Fig. 3 is a sectional plan view, the plane of section coinciding with the path of the article being bent.

The twin members, which are adjusted and held in proper relation to each other by means of the connecting-screws 40, as shown in Fig. 3, are clamped in position on the supporting-rail 41 by the plates 32, as stated. This supporting-rail is secured to the outer ends of arms 42, which are provided with sleeves 43, loosely mounted on the shaft 25, so as to permit the holding or correcting mechanism to move freely up and down. In order to relieve the bent shape of the weight of the holding mechanism, counterweights 44 are secured on the sleeves 43 opposite the arms 42, as shown in Figs. 2, 3, and 6.

In operating the machine the rolls 10 and 26 are first adjusted along their shafts and the rolls 26 adjusted vertically in accordance with the curvature to be given to the shape.

The twin members of the holding and correcting mechanism are then adjusted along the supporting-rail into the path of movement of the shape. As the front end of the shape passes beyond the bending-rolls 26 the supporting-rail is raised, so that the shape will pass below the rollers 38 and the portion $a$ of the shape between the rolls 33. After the end of the shape has passed under the rollers 38 the latter, resting on the shape, will support the holding or correcting mechanism, which will move up and down in accordance with any change in curvature of the shape. The rolls 33 will hold the shape as against accidental lateral curvature. If it be found that the mere holding of the bent part in alinement with the other portions of the shape will not prevent a distortion or lateral curvature after the shape leaves the machine, the screws 39 may be adjusted so that the shape will be curved by the rolls 33 in a direction opposite to that in which it would tend to curve—as, for example, if the intentional bending effected by the machine would also produce a curvature to the right in Fig. 3 the rolls 33 would be shifted sufficiently far to the left to correct this distortion or accidental curvature.

It will be readily understood by those skilled in the art that by the vertical adjustment of the rolls 26 as the shape passes through the machine the curvature of the shape may be varied. While the rolls within the housings or those on the overhanging ends of the shafts may be employed for the production of any lengths of arcs less than a complete circle, the rolls on the overhanging ends of the shafts are employed for the production of complete circles, for the reason that the rolls $10^a$ can be easily slipped off their shafts for the removal of the completed circle from the machine.

In order to adapt my machine for the straightening of bent shapes, one or more rolls 45 are adjustably secured on a shaft 46, which is journaled in boxes 47. These boxes are adjustably mounted on the front edges of the housings 5 and are adapted to be shifted up and down by screws 48. As shown in Figs. 2 and 5, the roll 45 is arranged to press down on the shape as it comes from between the rolls 10, when rotated in a reverse direction, so that by the adjustment of the roll 45 the shape can be straightened to any desired degree or even reversely curved. In order to prevent any distortion of the shape during the straightening or reverse curving, a holding or correcting mechanism similar to that hereinbefore described, and therefore similarly designated, is mounted on a supporting-rail $41^a$, secured to arms $42^a$, provided with sleeves 43, which are so mounted on the shaft 4 that the rails will be in front in the machine, as shown in Figs. 2 and 5. This auxiliary holding mechanism is counterbalanced by a weight 49 on an arm 50, secured to the shaft 51, which is mounted on bearings 52 on the housings. This shaft is also provided with oppositely-projecting arms 53, whose ends are connected by rods 54 with the arms $42^a$.

It is characteristic of my improvement that the several parts can be quickly and easily adjusted for operation on different sizes and styles of structural material and that in case too great curvature is given to a shape a reversal of the machine and the adjustment of the roll 45 will effect the desired correction. By means of the floating holding or correcting mechanism all distortion during the bending and straightening of the shapes is prevented or corrected.

Figure 24:
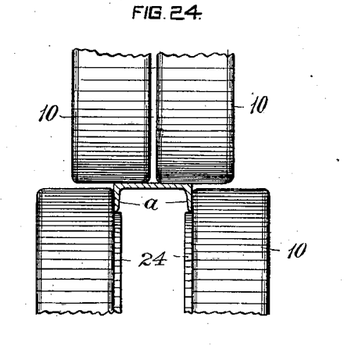
Figure 25:
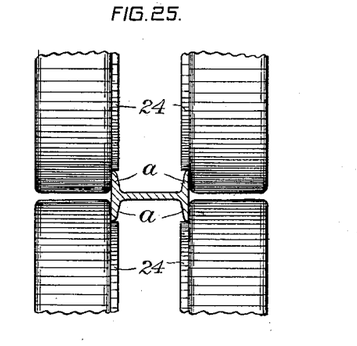

In Figs. 21 to 25, inclusive, is shown the manner of adjusting the rolls 10 or $10^a$ on the shafts 3 and 4 for gripping and holding the various shapes while being bent. It will be observed that in all cases the portions $a$, which are subjected to edgewise bending, are supported on both edges. In bending channels and I-bars, as shown in Figs. 24 and 25, the edgewise flexure of the portions $a$ is liable to produce an outward lateral distortion of said portions; but this is prevented by the sides of the lower rolls 10.

I claim herein as my invention—

1. In a machine for bending shapes, the combination of feeding and holding rolls, an adjustable bending-roll, and a floating mechanism free to move transversely to the path of movement of the article operated on for preventing or correcting lateral distortion of the shape during the bending operation, substantially as set forth.

2. In a machine for bending shapes, the combination of reversible feeding and holding rolls, adjustable bending-rolls arranged on opposite sides of the feeding and holding rolls, and floating mechanisms free to move transversely to the path of movement of the article operated on for preventing or correcting lateral distortion of the shapes, substantially as set forth.

3. In a machine for bending shapes, the combination of a shaft provided with a longitudinal groove, a roll movably mounted on the shaft and provided with a transverse groove in its inner perimeter, a threaded rod arranged in the groove in the shaft and a nut mounted on the shaft and extending into the grooves in the shaft and roll and interlocking with the latter so as to effect the adjustment thereof along and rotation with the shaft, substantially as set forth.

4. In a machine for bending shapes, the combination of a movable rail or support, rolls adjustably mounted on said rail so as to permit of the automatic shifting of their plane of rotation and means for adjusting the rolls toward and from each other, substantially as set forth.

5. In a machine for bending shapes, the combination of a movable rail or support, rolls adjustably mounted on the rail so as to permit of the automatic shifting of their plane of rotation, rollers for holding the rolls in operative relation to the shape being bent, and means for adjusting the rolls toward and from each other, substantially as set forth.

6. In a machine for bending shapes, the combination of a cylindrical shell, a bearing-block rotatably mounted in said shell and provided with prongs inclosed and laterally supported by the shell, and a roll loosely mounted between the prongs formed on the bearing-block with its axis at right angles to the axis of the block, substantially as set forth.

7. In a machine for bending shapes, a pivotally-mounted rail or support, twin mechanisms adjustably mounted on the rail, each of said mechanisms being provided with a roll adjustably mounted so as to permit of a shifting of its plane of rotation and with a yoke movable with the roll, in combination with retaining-rollers having their journals mounted in bearings carried by the yokes, substantially as set forth.

In testimony whereof I have hereunto set my hand.

SAMUEL E. DIESCHER.

Witnesses:
DARWIN S. WOLCOTT,
F. E. GAITHER.